(12) United States Patent
Chen

(10) Patent No.: US 8,721,323 B2
(45) Date of Patent: May 13, 2014

(54) LEVER-TYPE MOLD EJECTION MECHANISM OF INJECTION MOLDING MACHINE

(71) Applicant: Techwin Opto-Electronics Co., Ltd., New Taipei (TW)

(72) Inventor: Tsung-Huang Chen, New Taipei (TW)

(73) Assignee: Techwin Opto-Electronics Co., Ltd., New Taipei (TW)

( * ) Notice: Subject to any disclaimer, the term of this patent is extended or adjusted under 35 U.S.C. 154(b) by 0 days.

(21) Appl. No.: 13/843,783

(22) Filed: Mar. 15, 2013

(65) Prior Publication Data

US 2014/0030374 A1   Jan. 30, 2014

(30) Foreign Application Priority Data

Jul. 26, 2012   (TW) .............................. 101126977 A

(51) Int. Cl.
*B29C 45/40* (2006.01)

(52) U.S. Cl.
USPC ................... 425/556; 425/436 RM; 425/577

(58) Field of Classification Search
USPC ...... 425/436 R, 436 RM, 441, 442, 443, 556, 425/577
See application file for complete search history.

(56) References Cited

U.S. PATENT DOCUMENTS

| | | | |
|---|---|---|---|
| 1,639,840 A * | 8/1927 | Davis ............................. 264/334 |
| 2,301,819 A * | 11/1942 | Sambrook ..................... 164/404 |
| 2,581,854 A * | 1/1952 | Gries et al. ............... 264/328.11 |
| 3,299,453 A * | 1/1967 | De Meerendonk ........... 470/137 |
| 3,440,860 A * | 4/1969 | Byam et al. ...................... 72/427 |
| 3,807,682 A * | 4/1974 | Catinella et al. ................. 249/68 |
| 3,820,376 A * | 6/1974 | Koch et al. ....................... 72/427 |
| 3,938,585 A * | 2/1976 | Rader ............................ 164/347 |
| 4,552,525 A * | 11/1985 | Stehr .............................. 425/422 |
| 4,966,028 A * | 10/1990 | Sakamura et al. .............. 72/361 |
| 5,065,636 A * | 11/1991 | Riedisser et al. ................. 74/40 |
| 5,067,892 A * | 11/1991 | Rahn et al. ..................... 425/556 |
| 5,295,802 A * | 3/1994 | Hersbt .......................... 425/139 |
| 6,478,566 B1 * | 11/2002 | Ito et al. ........................ 425/154 |
| 6,921,258 B1 * | 7/2005 | Schmidt ........................ 425/556 |
| 7,082,807 B2 * | 8/2006 | Hoorelbeke .................... 72/345 |
| 7,135,080 B2 * | 11/2006 | Shimizu et al. ................. 156/64 |
| 7,232,539 B2 * | 6/2007 | Irwin et al. .................... 264/334 |
| 8,444,409 B2 * | 5/2013 | Eppich .......................... 425/444 |
| 2002/0110616 A1 * | 8/2002 | Meschia ....................... 425/556 |

* cited by examiner

*Primary Examiner* — Yogendra Gupta
*Assistant Examiner* — Emmanuel S Luk
(74) *Attorney, Agent, or Firm* — CKC & Partners Co., Ltd.

(57) ABSTRACT

A lever-type mold ejection mechanism is arranged on a platen of a mold in the injection molding machine. The lever-type ejection mechanism includes a base body arranged on the platen; an actuating cylinder having a motion shaft; a link rod having a first end and a second end opposite to each other, wherein the first end is pivotally disposed on the base body through a first pivot axis, and the second end is pivotally disposed on an end of the motion shaft of the actuating cylinder through a second pivot axis, and the link rod has a movable ejector pin at its bottom surface adjacent to the first end; and a ejector rod resisting between the ejector pin and the mold. The actuating cylinder is operated to push the mold through the link rod in a lever manner so as to obtain enough pushing force.

10 Claims, 5 Drawing Sheets

LEVER-TYPE MOLD EJECTION MECHANISM OF INJECTION MOLDING MACHINE

CROSS-REFERENCE TO RELATED APPLICATIONS

This application claims priority to Taiwan Application Serial Number 101126977, filed Jul. 26, 2012, which is herein incorporated by reference.

BACKGROUND OF THE INVENTION

1. Field of the Invention

The present invention relates to a mold ejection mechanism of an injection molding machine. More particularly, the present invention relates to an ejection mechanism for ejecting out a mold from the injection molding machine through a lever manner.

2. Description of the Related Art

After a product is injection molded by using an ejection molding machine, a mold of the ejection molding machine has to be ejected out by a mold ejection mechanism thereof, so as to take out the product ejection molded.

FIG. 1 illustrates a side view showing a conventional mold ejection mechanism and the structure of the mold ejection mechanism and an injection molding machine 200. As illustrated in FIG. 1, a conventional mold ejection mechanism is simply an actuating cylinder 300 arranged on a platen 220 of a mold 210 of the injection molding machine 200, and an actuating ejector rod 310 of the actuating cylinder 300 contacts directly with the mold 210, so as to eject out the mold 210 through a straight pushing motion of the actuating ejector rod 310 of the actuating cylinder 300.

The actuating cylinder 300 generally includes a pneumatic cylinder and a hydraulic cylinder. The pneumatic cylinder uses air as a medium for a pushing motion of the actuating ejector rod, and although a gas leakage problem may appear after a period of operation time, yet the leaked gas does not pollute neighboring machine parts and environment. However, a pushing force of the pneumatic cylinder is apparently smaller than that of the oil hydraulic cylinder. Although the hydraulic cylinder may provide a greater pushing force, it uses oil as a medium for the pushing motion of the actuating ejector rod, and, when an oil leakage problem appears after a period of operation time due to gradually decreasing performance of an oil seal, the leaked oil will pollute neighboring machine parts and environment.

The aforementioned conventional straightforward mold ejection mechanism cannot overcome respective disadvantages of using the pneumatic or hydraulic cylinder. That is, the conventional mold ejection mechanism directly applies the actuating ejector rod 310 of the actuating cylinder 300 to the mold 210 straightforward. By this straightforward forcing, a force exerted by the actuating cylinder 300 is the same as that applied to the mold 210. At this time, if a pneumatic cylinder is used as a power source of the actuating cylinder 300, the mold 210 may not be pushed since the pneumatic cylinder cannot provide enough pushing force. Therefore, the actuating cylinder 300 currently used by a mold ejection mechanism of the injection molding machine is typically a hydraulic cylinder so as to provide the mold 210 with enough pushing force. However, as described above, the hydraulic cylinder has the disadvantage of oil leakage which will pollute neighboring machine parts and environment. Particularly, an actuating ejector rod 310 of the hydraulic cylinder directly contacts the mold 210, and may directly pollute the mold, thus causing inconvenience and troubles in cleaning and maintenance of the polluted machine parts.

The applicability of the conventional straightforward mold ejection mechanism is poor due to the foregoing reasons.

SUMMARY OF THE INVENTION

For the disadvantages of the aforementioned conventional straightforward mold ejection mechanism, an object of the present invention is to provide a lever-type mold ejection mechanism of an injection molding machine with enough pushing force.

Another object of the present invention is to provide a lever-type mold ejection mechanism of an injection molding machine without causing oil leakage and pollution problems.

According to one of the aforementioned objects, an aspect of the present invention is to provide a lever-type mold ejection mechanism arranged on a platen of a mold of an injection molding machine. The lever-type ejection mechanism includes a base body arranged on the platen; an actuating cylinder having a motion shaft; a link rod having a first end and a second end opposite to each other, wherein the first end is pivotally disposed on the base body through a first pivot axis, and the second end is pivotally disposed on an end of the motion shaft of the actuating cylinder through a second pivot axis, and a movable ejector pin is disposed on a bottom surface of the link rod adjacent to the first end; and a ejector rod resisting between the ejector pin and the mold. The actuating cylinder pushes the mold in a lever manner though the link rod, so as to obtain enough pushing force.

According to an embodiment of the present invention, an arc-shaped groove is formed on the bottom surface of the link rod adjacent to the first end, and the arc-shaped groove is provided with an opening at its bottom, wherein the ejector pin may be movably arranged in the arc-shaped groove; and a portion of a peripheral surface of the ejector pin protrudes out of the bottom surface of the link rod through the opening of the arc-shaped groove. Accordingly, the ejection pin can be movably arranged on the bottom surface of the link rod, and a contact point of the force exerted on the ejector rod by the ejector pin can be changed.

According to another embodiment of the present invention, the actuating cylinder is arranged on a platen through a supporting base. Accordingly, the actuating cylinder is located at an elevation higher than the base body, thereby facilitating the force-applying operation of the actuating cylinder.

According to a further embodiment of the present invention, the base body has two side walls spaced from each other. A first connection opening is formed between the two side walls of the base body. The first end of the link rod is arranged in the first connection opening. The two side walls of the base body and the first end are pivotally connected through a first pivot axis. Accordingly, a stable pivot connection between the first end of the link rod and the base body is achieved.

According to yet a further embodiment of the present invention, an end of the motion shaft of the actuating cylinder has two side walls spaced from each other. A second connection opening is formed between the two side walls of the motion shaft. A second end of a link is arranged in the second connection opening. The two side walls of the motion shaft and the second end are pivotally connected through the second pivot. Accordingly, a stable pivot connection between the second end of the link rod and actuating cylinder is achieved.

According to still yet a further embodiment of the present invention, the actuating cylinder is a pneumatic cylinder for preventing the pollution problem caused by oil leakage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

In order to make the foregoing as well as other aspects, features, advantages, and embodiments of the present invention more apparent, the accompanying drawings are described as follows.

DETAILED DESCRIPTION

The foregoing and other descriptions, features and functions of the present invention will be clearly shown in the following detailed description of embodiments with reference to the accompanying drawings.

Figure 1:
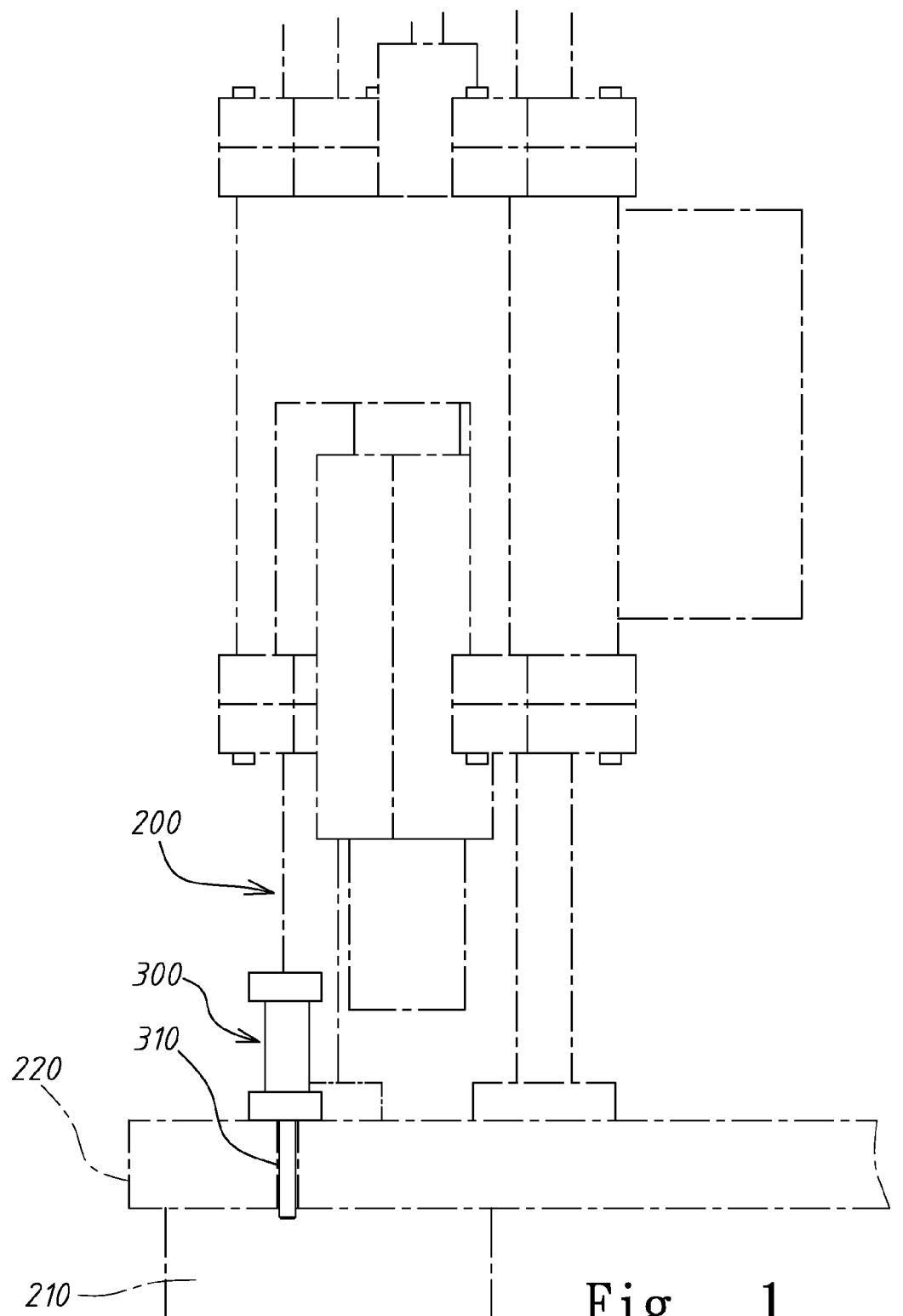
FIG. 1 illustrates a side view showing a conventional mold ejection mechanism and the structure of the mold ejection mechanism and an injection molding machine.
Figure 2:
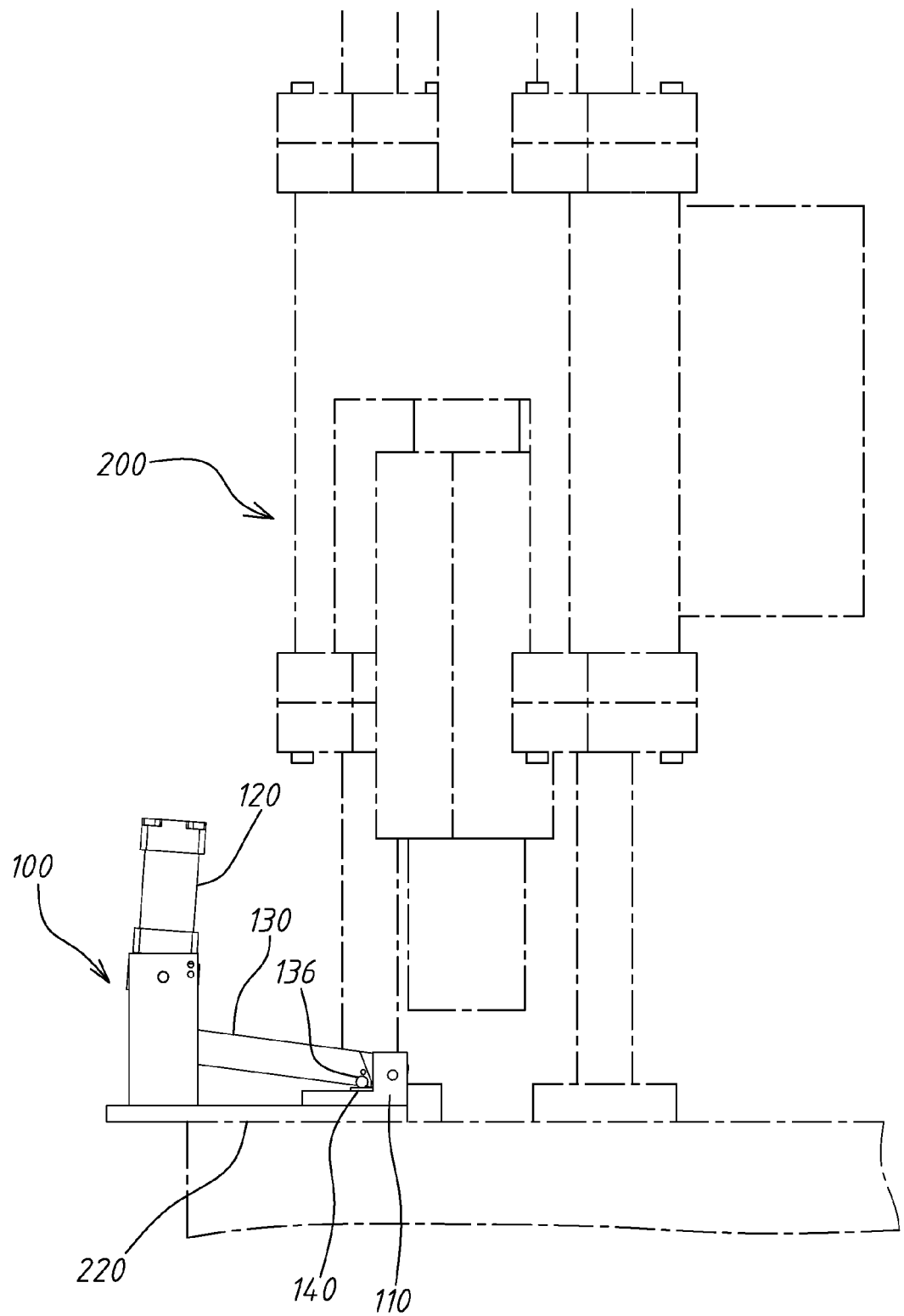
FIG. 2 illustrates a side view showing a lever-type mold ejection mechanism and the structure of the lever-type mold ejection mechanism and an injection molding machine according to an embodiment of the present invention.
Figure 3:
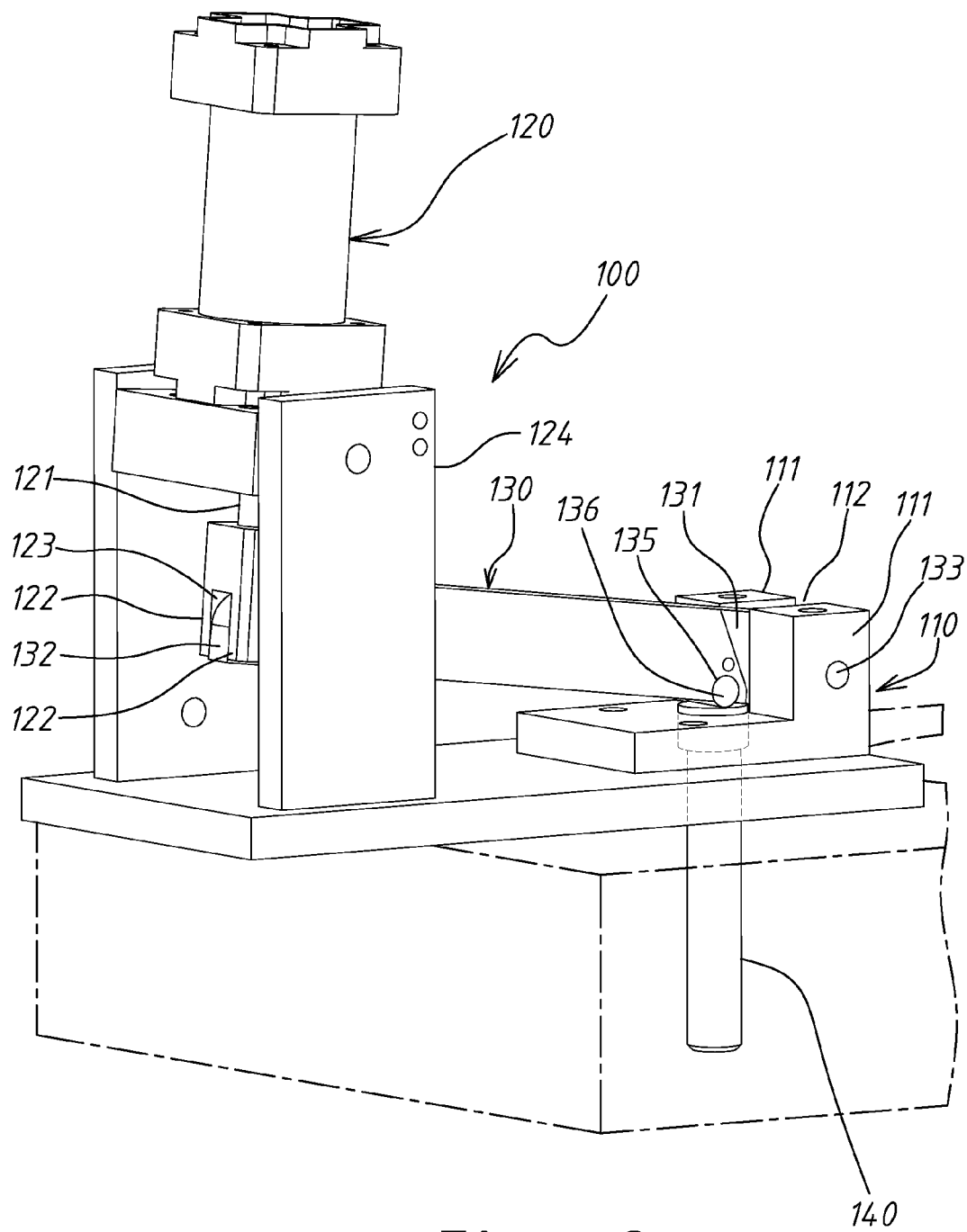
FIG. 3 illustrates a schematic 3-D view showing the appearance of the lever-type mold ejection mechanism shown in FIG. 2.
Figure 4:
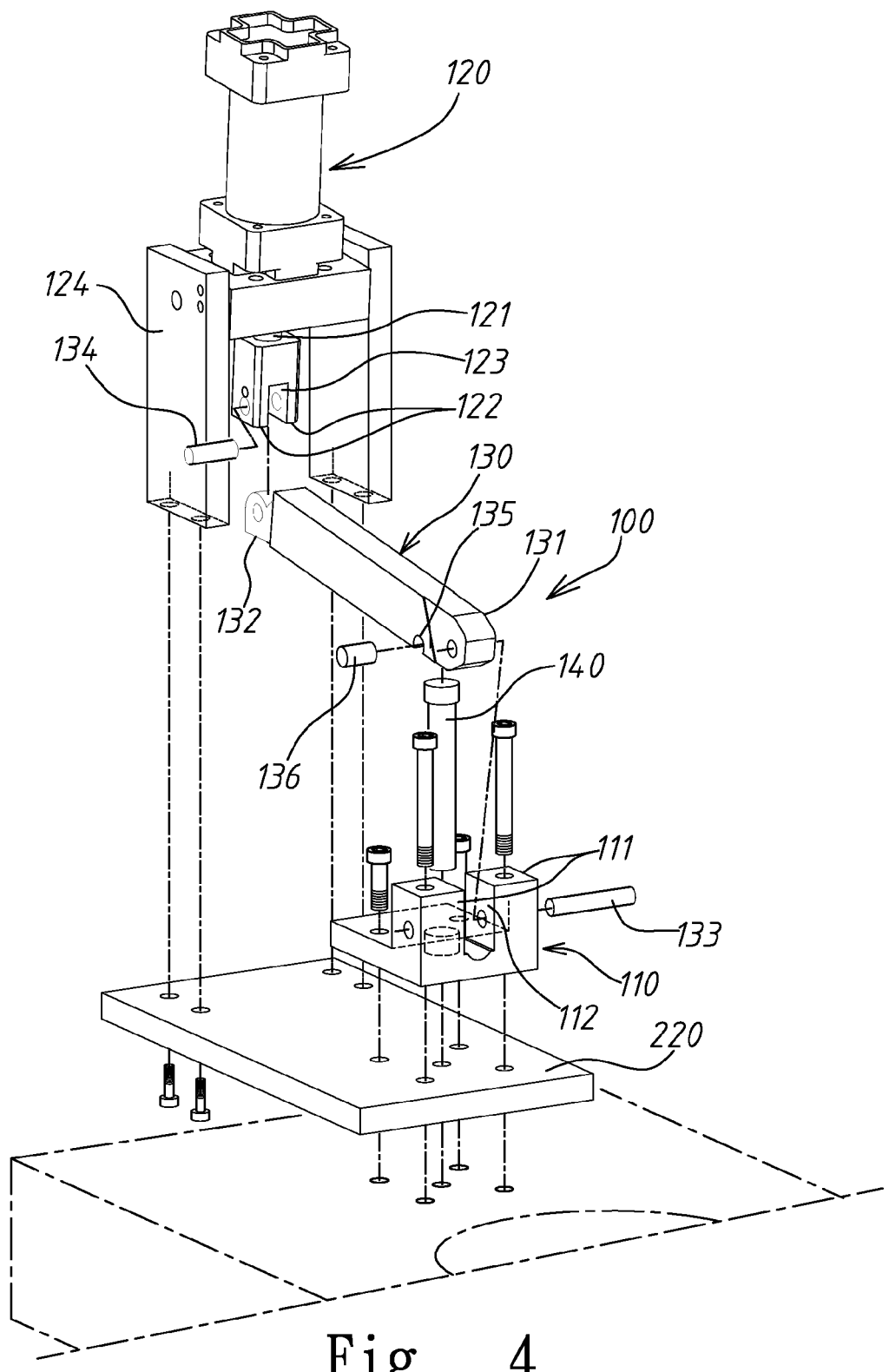
FIG. 4 illustrates a schematic exploded view of the lever-type mold ejection mechanism shown in FIG. 3.

FIG. 2 illustrates a side view showing a lever-type mold ejection mechanism 100 and the structure of the lever-type mold ejection mechanism 100 and an injection molding machine 200 according to an embodiment of the present invention; FIG. 3 illustrates a schematic 3-D view showing the appearance of the lever-type mold ejection mechanism 100 shown in FIG. 2; and FIG. 4 illustrates a schematic exploded view of the lever-type mold ejection mechanism 100 shown in FIG. 3. As shown in the Figures, the level-type mold ejection mechanism 100 of the injection molding machine 200 includes a base body 110, an actuating cylinder 120, a link rod 130 and an ejector rod 140.

The base body 110 is arranged on a platen 220 of a mold 210 of the injection molding machine 200. The actuating cylinder 120 is arranged on the platen 220 through a supporting base 124, such that the actuating cylinder 120 is located at an elevation higher than the base body 110, thereby facilitating the force-applying operation of the actuating cylinder 120. The actuating cylinder 120 may be any type of cylinder for providing a dynamic force, such as a pneumatic cylinder. The actuating cylinder 120 has a motion shaft 121 for performing back and forth movements.

The link rod 130 has a first end 131 and a second end 132 opposite to each other. The first end 131 is pivotally disposed on the base body 110 through a first pivot 133, and the second end 132 pivotally disposed on an end of the motion shaft 121 of the actuating cylinder 120 through a second pivot 134. In practice, the base body 110 has two side walls 111 spaced from each other. A first connection opening 112 is formed between the two side walls of the base body 110. The first end 131 of the link rod 130 is arranged in the first connection opening 112 of the base body 110, and then the two side walls 111 of the base body 110 and the first end 131 of the link rod 130 are pivotally connected through the first pivot axis 133. Similarly, an end of the motion shaft 121 of the actuating cylinder 120 has two side walls 122 spaced from each other. A second connection opening 123 is formed between the two side walls of the motion shaft 121. The second end 132 of the link rod 130 is arranged in the second connection opening 123 of the actuating cylinder 120, and then the two side walls 122 of the motion shaft 121 of the actuating cylinder 120 and the second end 132 of the link rod 130 are pivotally connected through the second pivot axis 134. Accordingly, a stable pivot connection between one end of the link rod 130 and the base body 110, and a stable pivot connection between the other end of the link rod 130 and the actuating cylinder 120 are achieved.

A movable ejector pin 136 is disposed on the bottom surface of the link rod 130 adjacent to the first end 131. In practice, an arc-shaped groove 135 is formed on the bottom surface of the link rod 130 adjacent to the first end 131, and the arc-shaped groove 135 is provided with an opening at its bottom. The ejector pin 136 may be movably arranged in the arc-shaped groove 135, and a portion of a peripheral surface of the ejector pin 136 protrudes out of the bottom surface of the link rod 130 through the opening of the arc-shaped groove 135. The ejector pin 136 can have a movable-contact and resisting-against joint relationship with the ejector rod 140 described in the below.

In design, the arc-shaped groove 135 covers an external periphery of the ejector pin 136 by more than an arc of 180 degrees so as to hold the ejector pin 136, such that the ejector pin 136 will not drop out from the bottom opening of the arc-shaped groove 135.

The ejector rod 140 resists between the ejector pin 136 and the mold 210, so as to deliver a force from the ejector pin 136 to the mold 210. Moreover, due to mobility of the ejector pin 136, a circular motion of the link rod 130 using the first pivot axis 133 as a fulcrum is changed to a linear motion of pushing the ejector rod 140 straightforward.

Figure 5:
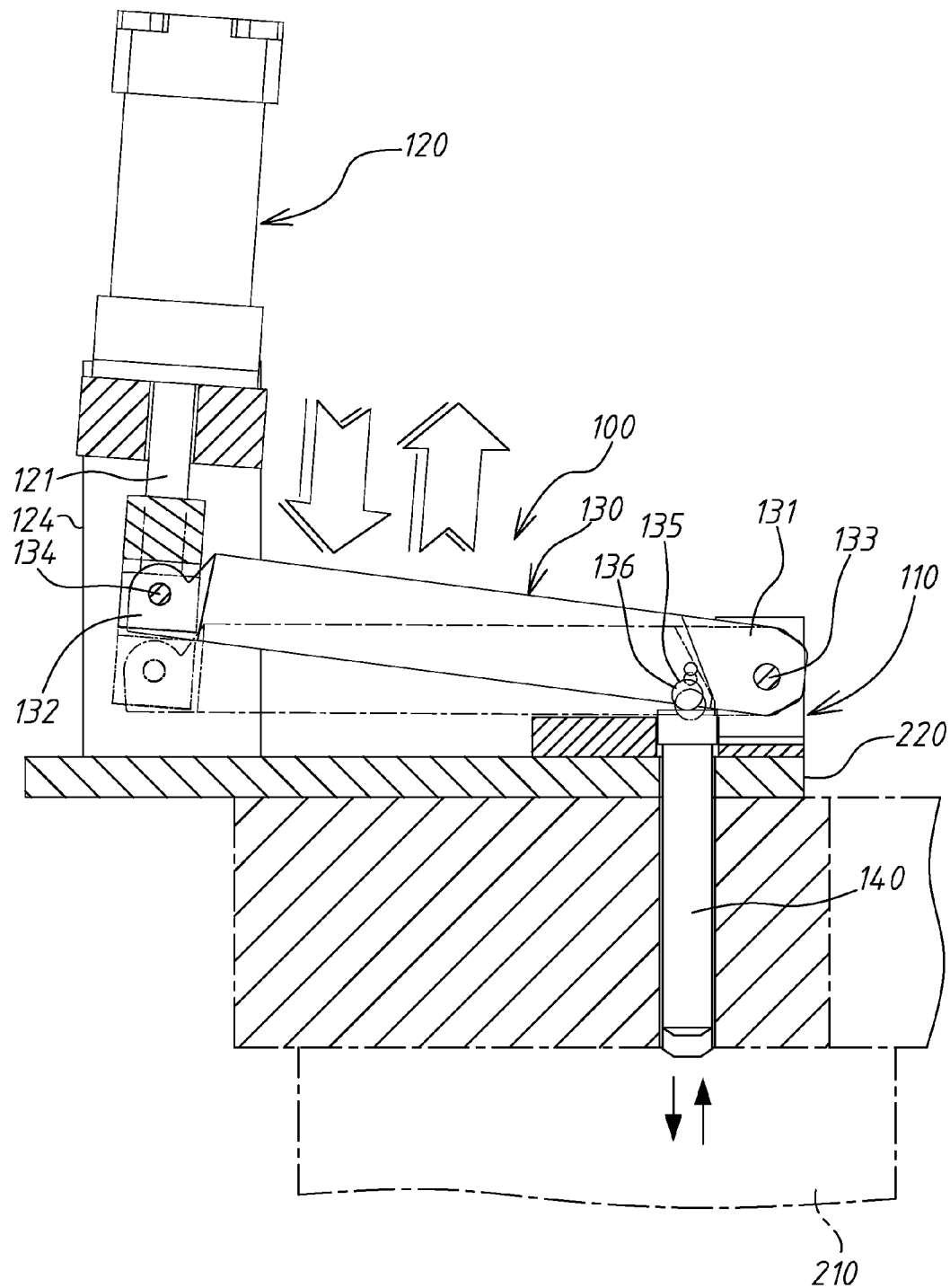
FIG. 5 illustrates a schematic cross-sectional view showing the lever-type mold ejection mechanism shown in FIG. 3 and its motion.

Referring to FIG. 5 at the same time, FIG. 5 illustrates a schematic cross-sectional view showing the lever-type mold ejection mechanism of the injection molding machine and shows its motion according to an embodiment of the present invention. During the injection molding operation of the injection molding machine, the mold 210 is located at a fixed position to resist the ejector rod 140 upwards, in which the ejector rod 140 is in contact with the mold 210. After the injection molding operation is completed, the mold 210 has to be ejected out. According to the level-type mold ejection mechanism 100 of an embodiment of the present invention, when the mold 210 is being ejected out, the motion shaft 121 of the actuating cylinder 120 exerts a pushing force to the second end 132 of the link rod 130, such that the link rod 130 correspondingly moves downward by using the first pivot axis 133 at its first end 131 as a fulcrum, and drives the ejector pin 136 at the bottom surface of the link rod 130 to push the ejector rod 140 to eject out the mold 121 downward in a lever manner. Because the actuating cylinder 120 exerts a pushing force to the mold 210 through the link rod 130 in the lever manner and there is a longer lever arm between the actuating cylinder 120 and the ejector pin 136 which is used as a point of application, a smaller force exerted by the actuating cylinder 120 can be enough to push out the mold 210. Therefore, although a pneumatic cylinder with a smaller pushing force is used as the power source of the actuating cylinder 120, the pushing force is enough to eject out the mold 210. Besides, the pneumatic cylinder has the advantages of not polluting machine parts and the environment.

According to the embodiment of the present invention, the lever-type mold ejection mechanism of the injection molding machine has enough pushing force, and the actuating cylinder used as a power source does not have the pollution problem caused by oil leakage. According to the above description, the objects of the present invention can be achieved.

Although the present invention has been disclosed with reference to the above embodiments, these embodiments are not intended to limit the present invention. It will be apparent to those skilled in the art that various modifications and variations may be made without departing from the spirit and scope of the present invention. Therefore, the scope of the present invention shall be defined by the appended claims.

What is claimed is:

1. A lever-type mold ejection mechanism arranged on a platen of a mold of an injection molding machine, comprising:
    a base body arranged on the platen;
    an actuating cylinder having a motion shaft;
    a link rod having a first end and a second end which are opposite to each other, wherein the first end is pivotally disposed on the base body through a first pivot axis, and the second end is pivotally disposed on an end of the motion shaft of the actuating cylinder through a second pivot axis, and a movable ejector pin is disposed on a bottom surface of the link rod adjacent to the first end; and
    an ejector rod resisting between the ejector pin and the mold.

2. The lever-type mold ejection mechanism of claim 1, wherein an arc-shaped groove is formed on the bottom surface of the link rod adjacent to the first end, and the arc-shaped groove is provided with an opening at its bottom, and the ejector pin is movably arranged in the arc-shaped groove, and a portion of a peripheral surface of the ejector pin protrudes out of the bottom surface of the link rod through the opening of the arc-shaped groove.

3. The lever-type mold ejection mechanism of claim 1, wherein the actuating cylinder is arranged on the platen through a supporting base.

4. The lever-type mold ejection mechanism of claim 2, wherein the actuating cylinder is arranged on the platen through a supporting base.

5. The lever-type mold ejection mechanism of claim 1, wherein the base body has two side walls spaced from each other, and a first connection opening is formed between the two side walls of the base body, and the first end of the link rod is arranged in the first connection opening, and the two side walls of the base body and the first end are pivotally connected through the first pivot axis.

6. The lever-type mold ejection mechanism of claim 2, wherein the base body has two side walls spaced from each other, and a first connection opening is formed between the two side walls of the base body, and the first end of the link rod is arranged in the first connection opening, and the two side walls of the base body and the first end are pivotally connected through the first pivot axis.

7. The lever-type mold ejection mechanism of claim 1, wherein the end of the motion shaft of the actuating cylinder has two side walls spaced from each other, and a second connection opening is formed between the two side walls of the motion shaft, and the second end of the link rod is arranged in the second connection opening, and the two side walls of the motion shaft and the second end are pivotally connected through the second pivot axis.

8. The lever-type mold ejection mechanism of claim 2, wherein the end of the motion shaft of the actuating cylinder has two side walls spaced from each other, and a second connection opening is formed between the two side walls of the motion shaft, and the second end of the link rod is arranged in the second connection opening, and the two side walls of the motion shaft and the second end are pivotally connected through the second pivot axis.

9. The lever-type mold ejection mechanism of claim 1, wherein the actuating cylinder is a pneumatic cylinder.

10. The lever-type mold ejection mechanism of claim 2, wherein the actuating cylinder is a pneumatic cylinder.

* * * * *